Figure 1:
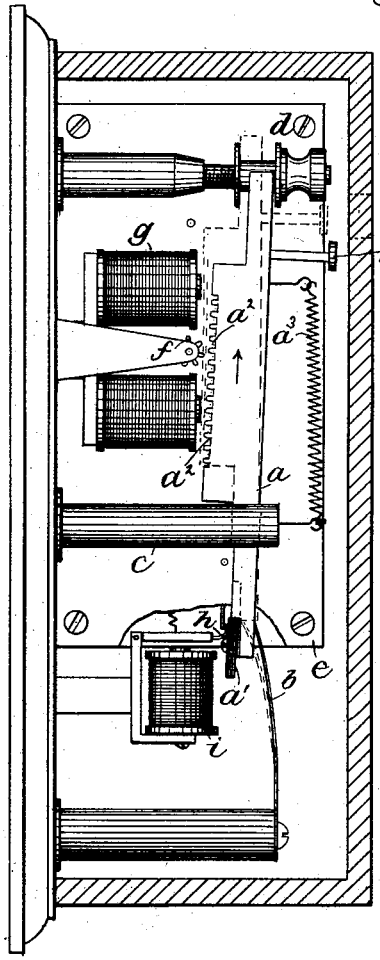

(No Model.)

C. B. BOSWORTH.
CIRCUIT BREAKER.

No. 374,652. Patented Dec. 13, 1887.

Witnesses.
Jas. J. Maloney.
M. B. Hill.

Inventor,
Charles B. Bosworth,
by Jos. P. Livermore
Att'y.

UNITED STATES PATENT OFFICE.

CHARLES B. BOSWORTH, OF EVERETT, MASSACHUSETTS, ASSIGNOR TO THE ELECTRIC GAS LIGHTING COMPANY, OF PORTLAND, MAINE.

CIRCUIT-BREAKER.

SPECIFICATION forming part of Letters Patent No. 374,652, dated December 13, 1887.

Application filed January 17, 1887. Serial No. 224,580. (No model.)

*To all whom it may concern:*

Be it known that I, CHARLES B. BOSWORTH, of Everett, county of Middlesex, State of Massachusetts, have invented an Improvement in Cut-Outs or Circuit-Breakers, of which the following description, in connection with the accompanying drawings, is a specification, like letters on the drawings representing like parts.

My invention relates to an automatic circuit-opener to be used in connection with electric gas-lighting circuits or in other apparatus in which a battery is included in a normally-open circuit, which in the regular operation is closed only for short periods of time, and in which, if the circuit becomes closed for a longer period by the accidental connection of wires or imperfect insulation, the battery rapidly becomes exhausted.

The apparatus forming the subject of the present invention is adapted to be used in cases where the circuit of a single battery is divided into a number of branches, each containing a portion of the devices that are to be operated by the current of the battery; and the circuit-opener forming the subject of this invention is called into operation whenever any one of the said branches is closed, and will open that branch in case it is kept closed beyond a predetermined period of time greater than that required for the normal operation, thus open-circuiting the battery without rendering any of the other branches inoperative.

The invention is embodied in an apparatus comprising a normally-closed circuit-breaker in each branch circuit and a motor for moving one member of the said circuit-breaker in the direction to open the circuit, but requiring a definite predetermined period of time to accomplish such movement, the said circuit-breaker being normally disengaged from the motor when the circuit is open, and the apparatus containing means for engaging the circuit-breaker with the motor only while the circuit remains closed. The motor preferably runs only when one of the branch circuits is closed, and is provided with a detent which releases it whenever one of the circuits is closed, but stops it at other times. The circuit-breaker is disengaged from the motor as soon as the corresponding circuit is opened, and in case it has been opened at any point other than at the said circuit-breaker before the predetermined time has elapsed, the latter will be at once restored to its normal position, so that at the next operation it will require the full period of time to open it. When, however, the circuit-breaker of the cut-out instrument has been opened, it is retained in the position to which it was moved by the motor to thus open the circuit, and it is provided with an indicator, which shows its change of position, and thus indicates at a glance which one of the branch circuits has been deranged.

Figure 2:
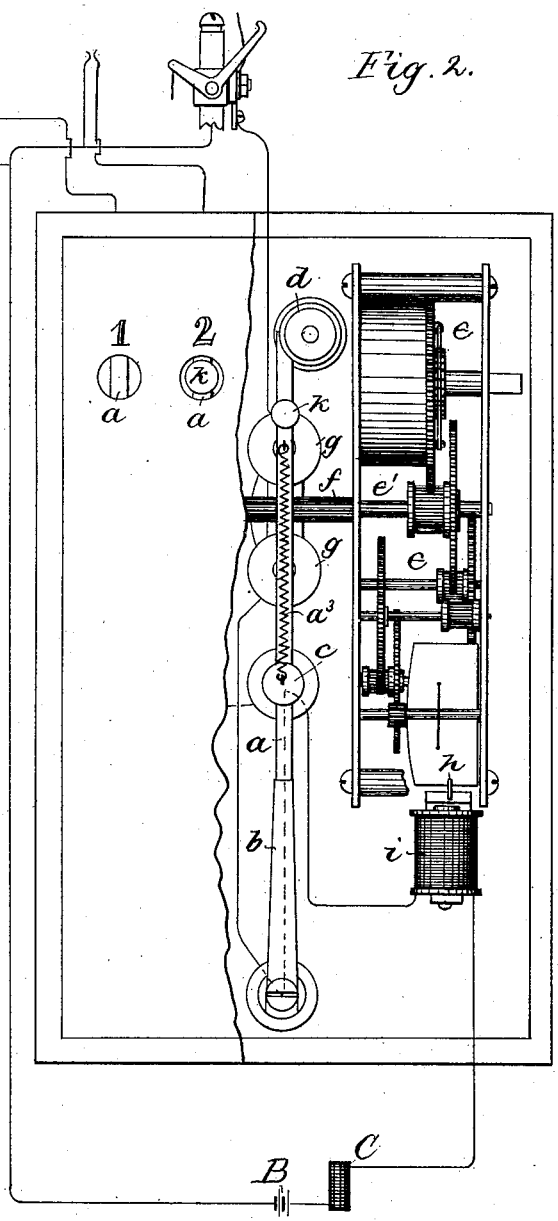

Figure 1 is a side elevation of an automatic circuit-opener embodying this invention; and Fig. 2, a front view thereof, a portion of the inclosing-case being broken away.

The instrument is shown as adapted to control three branch circuits; but it is apparent that it may be used to control any required number. It comprises a circuit-breaker, *a b*, in each of the branch circuits to be controlled, the member *a* of which, as herein shown, consisting of a bar of metal having a rocking and sliding movement in a guide, *c*, the rocking movement being limited by a stop, *d*.

The member *b* of the circuit-breaker consists of a spring bearing on the bar *a* near its end; and the said bar is provided with a piece, *a'*, of insulating material, which, when the bar is moved in the direction of the arrow thereon, Fig. 1, a sufficient distance—that is, to the position shown in dotted lines—will receive the spring *b*, and thus break the circuit between *a* and *b*. In order to produce this lengthwise movement of the bar *a* and to regulate its speed, so that any required period of time may elapse before it will pass by the end of the spring *b* and open the circuit, the said member *a* is at the proper times engaged with some part of a motor, *e*, (best shown in Fig. 2,) consisting of an ordinary train of clock-work. (Shown in this instance as having one of its arbors, as *e'*, provided with a grooved rod, *f*, which practically constitutes a long pinion, or, if desired, the arbor *e'* might be prolonged and provided with a number of separate pinions.)

Various devices might be employed to connect the movable member of one of the circuit-breakers with the motor when the corresponding circuit is closed; and the one herein shown as employed to carry out the invention is extremely simple and reliable, and is found to work excellently in practice. It consists in providing the bar $a$ with a series of teeth, forming a rack, $a^2$, which, by the rocking movement of the said bar in its guides, may be engaged with or disengaged from the pinion $f$ of the motor without interfering with the longitudinal movement of the said bar.

The rocking movement of the bar $a$ by which it is engaged with the pinion $f$, so as to be moved by the motor, is produced by an electro-magnet, $g$, included in the same circuit as the circuit-breaker $a\ b$, the whole or a portion of the member $a$ of which is composed of magnetic material, and thus constitutes an armature for the magnet $g$, which, when energized, will rock the bar so as to bring the rack $a^2$ into engagement with the pinion $f$ and to hold it thus engaged as long as the magnet remains energized. The moment, however, the circuit of the magnet is broken the bar $a$ is retracted by a spring, $a^3$, or equivalent, out of engagement with the said pinion and returned at once to its normal position, provided that its lengthwise movement has not been sufficient to cause the spring $b$ to drop onto the insulated portion $a'$.

The motor $e'$ might run continuously; but in order to avoid the necessity of frequent winding it is preferably stopped, except when one of the circuits is closed, the said motor being provided with a detent, $h$, operated by the armature of an electro-magnet, $i$, which may be in the battery or return-wire common to all the branches controlled by the different circuit-breakers $a\ b$, so that by the closing of any one of the branch circuits the magnet $g$ in that branch and the magnet $i$ are both energized, thus setting the motor in operation, and at the same time engaging with the motor the circuit-breaker of that branch only which is closed; and when the said branch is opened, either by the usual normal operation or by the action of the circuit-breaker $a\ b$, in case it has been closed an abnormal length of time at some other point, the magnets will be demagnetized, thus disengaging the circuit-breaker from the motor and at the same time stopping the motor.

The movable members of the different circuit-breakers are preferably provided with indicators $k$, which by their change of position will show at once which circuit has been closed at some point external to the instrument beyond the predetermined time, these indicators being preferably concealed when in their normal position, but being moved into view through a suitable opening in the inclosing-case, as indicated in Fig. 2, if the corresponding branch circuit has been opened by the cut-out instrument.

A circuit is represented in diagram, Fig. 2, including a battery, B, and spark-coil C, from which the circuit is continued to the magnet $i$ and thence to the guide-pieces $c$ and members $a$ of all the circuit-breakers, while from the other member, $b$, of each circuit-breaker a separate branch is continued through the corresponding magnet, $g$, to the gas-burners, or other instrument intended to use the current of the battery, and back to the battery by a common return-wire.

The derangement of any one of the circuits, and consequent opening of the circuit-breaker $a\ b$ therein, does not in any way affect the usefulness of the other circuits or interfere with the operation of the instruments therein.

I claim—

1. A main circuit and number of normally-open branch circuits, combined with a normally-closed circuit-breaker in each branch circuit, a motor normally disengaged from said circuit-breakers, and engaging devices by which each circuit-breaker is connected with the motor independently of all others when the corresponding branch circuit is closed, the said circuit-breaker being moved by the motor in the direction to open the circuit and finally opening the same if it remains in engagement with the motor for a predetermined period of time, substantially as described.

2. The combination of a motor and a toothed wheel or pinion actuated thereby with a rack-toothed bar having a rocking and sliding movement and constituting an armature and an electro-magnet having the said bar in its field, whereby the said magnet, when energized, rocks the bar and brings the rack into engagement with the pinion, substantially as and for the purpose described.

3. The combination of a motor provided with a detent and electro-magnet controlling the same with a series of circuit-breakers and corresponding independent electro-magnets, each controlling the engagement of the corresponding circuit-breaker with the said motor, which moves the said circuit-breaker when engaged therewith and opens the circuit when the said engagement continues for a predetermined period of time, substantially as described.

4. The combination of a main circuit and a number of branch circuits therefrom with independent circuit-breakers in each of said branch circuits, the movable members of which are provided with indicators, and a motor normally disengaged from said circuit-breakers, and an electro-magnet in each branch which, when energized, engages the corresponding circuit-breaker with the motor, substantially as described.

In testimony whereof I have signed my name to this specification in the presence of two subscribing witnesses.

CHARLES B. BOSWORTH.

Witnesses:
  JOS. P. LIVERMORE,
  JAS. J. MALONEY.